US007707581B2

(12) United States Patent
Inoue (10) Patent No.: US 7,707,581 B2
(45) Date of Patent: Apr. 27, 2010

(54) METHOD AND SYSTEM FOR MANAGING SERVER LOAD TO EXECUTE TRANSACTIONS OF AN APPLICATION PROGRAM ON MULTIPLE SERVERS

(75) Inventor: Masashi Inoue, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 11/358,462

(22) Filed: Feb. 21, 2006

(65) Prior Publication Data
US 2006/0195579 A1 Aug. 31, 2006

(30) Foreign Application Priority Data
Feb. 28, 2005 (JP) .............................. 2005-054262

(51) Int. Cl.
G06F 9/46 (2006.01)
G06F 15/16 (2006.01)
G06F 15/173 (2006.01)

(52) U.S. Cl. ........................ 718/105; 718/100; 718/104; 709/203; 709/221; 709/224; 709/226

(58) Field of Classification Search ...................... 718/1, 718/100, 102, 103, 104, 105; 709/201, 202, 709/203, 220, 221, 222, 223, 224, 226, 225
See application file for complete search history.

(56) References Cited

U.S. PATENT DOCUMENTS 5,235,508 A * 8/1993 Lirov et al. .................... 700/99
5,881,283 A * 3/1999 Hondou et al. .............. 718/100
6,950,848 B1 * 9/2005 Yousefi'zadeh ............. 709/203
7,480,719 B2 * 1/2009 Inoue ......................... 709/226
7,493,380 B2 * 2/2009 Aman et al. ................. 709/223

(Continued)

FOREIGN PATENT DOCUMENTS

JP    PUPA63-184840    7/1988

(Continued)

OTHER PUBLICATIONS

Tetsuya Murata; "Guide for WEB system churning", Software Design, Gijitsu-Hyohron Co., Ltd. 20030218, No. 148, pp. 112-139.

Primary Examiner—Van H Nguyen
Assistant Examiner—Abdullah Al Kawsar
(74) Attorney, Agent, or Firm—Jack P. Friedman; Shimokaji & Associates, P.C.

(57) ABSTRACT

A method and system for managing server load to execute groups of transactions of an application program on N servers. A condition, ascertained for each transaction group, is that a current value of global multiplicity is not or is, respectively, less than a specified maximum value of global multiplicity. For each transaction group, an instruction is or is not issued to each server to change a current value of the maximum permitted local multiplicity for each server to a new value of the maximum permitted local multiplicity. For each transaction group: global multiplicity denotes a number of transactions concurrently performed by the N servers collectively; and local multiplicity for each server denotes a number of transactions concurrently performed by each server. The issuing or not issuing depends on the ascertained condition and whether the current value of the maximum local multiplicity is a default value for each server.

10 Claims, 9 Drawing Sheets

U.S. PATENT DOCUMENTS

| | | | | |
|---|---|---|---|---|
| 2003/0023727 A1* | 1/2003 | Hunt et al. | | 709/225 |
| 2004/0078742 A1* | 4/2004 | Emek et al. | | 714/728 |
| 2005/0172303 A1* | 8/2005 | Kudo et al. | | 719/316 |
| 2006/0165000 A1* | 7/2006 | Nakaminami et al. | | 370/242 |

FOREIGN PATENT DOCUMENTS

| | | |
|---|---|---|
| JP | PUPA9-120389 | 5/1997 |
| JP | 2001-160040 | 6/2001 |

* cited by examiner

METHOD AND SYSTEM FOR MANAGING SERVER LOAD TO EXECUTE TRANSACTIONS OF AN APPLICATION PROGRAM ON MULTIPLE SERVERS

BACKGROUND OF THE INVENTION

1. Technical Field

The present invention relates generally to managing server load for executing transactions in a distributed computing environment, and more particularly to managing server load for executing transactions of an application program on multiple servers.

2. Related Art

Recently, as use of the Internet and intranets has spread, notable advances have been made in the development of distributed computing technology employed for business systems. Generally, in a distributed computing environment a plurality of application servers are available to perform the processing for multiple transactions. Likewise, in a distributed computing environment, individual application servers perform database server related data inquiries, data updating and other operations (hereinafter collectively called "database processing"), as needed, via a network, and employ the data obtained to perform transactions.

One technique for controlling loads imposed in a distributed computing environment, in which a server program is executed by one computer, comprises increasing the multiplicity of the server program when the frequency at which the server program is used by the CPU of the computer is high. Another technique in a client-server system, wherein a load distribution apparatus and a server computer are connected by a LAN, comprises having the load distribution device halt the acceptance of transactions from a terminal when the load imposed on the server computer exceeds a threshold value.

Generally, in a distributed computing environment, application servers perform database server related database processing, as needed, via a network, and handle transactions. Since the database server stores data used in common by individual application programs or individual application servers, the database server tends to be prepared in common for the individual application servers. Multiple database processes may be executed, throughout the entire system, so that the response by the database server becomes a bottleneck in the transaction process.

Furthermore, relative to the allocation of transaction processes to application servers in a distributed computing environment, data should be exchanged through a plurality of transactions originating at the same client computer. Thus, these transactions must be processed by the same application server (generally, the property of this transaction process is called a session sticky characteristic). Because of the session sticky characteristic, discrepancies may occur in the allocation of transactions to the application servers. In a distributed computing environment, an undesirable phenomenon may occur wherein while one server is assumed to be busy and its acceptance of a transaction must be delayed, another server is idle. In addition, a situation may occur wherein the processing capability of the entire system is not exceeded.

Thus, there is a need for efficiently managing server load for executing transactions in a distributed computing environment.

SUMMARY OF THE INVENTION

The present invention provides a method for managing server load for executing transactions of an application program on N servers, said N at least 2, the transactions of the application program grouped into T transaction groups, said T at least 1, a local multiplicity for each server for each transaction group defined as a number of transactions concurrently performed by each server for each transaction group, a global multiplicity for each transaction group defined as a number of transactions concurrently performed by the N servers collectively for each transaction group, said method comprising:

ascertaining a condition for each transaction group, said condition being a first condition or a second condition, said first condition is that a current value of global multiplicity is not less than a specified maximum value of global multiplicity, said second condition is that the current value of global multiplicity is less than the specified maximum value of global multiplicity; and after said ascertaining, for each transaction group, issuing or not issuing an instruction to each server to change a current value of maximum permitted local multiplicity for each server to a new value of maximum permitted local multiplicity for each server, said issuing or not issuing being dependent on both the ascertained condition and whether a third condition is satisfied, said third condition being that the current value of maximum permitted local multiplicity is a default value of maximum permitted local multiplicity for each server.

The present invention provides a system comprising a management server for managing server load for executing transactions of an application program on N servers, said N at least 2, the transactions of the application program grouped into T transaction groups, said T at least 1, a local multiplicity for each server for each transaction group defined as a number of transactions concurrently performed by each server for each transaction group, a global multiplicity for each transaction group defined as a number of transactions concurrently performed by the N servers collectively for each transaction group, said management server adapted to perform a method, said method comprising;

ascertaining a condition for each transaction group, said condition being a first condition or a second condition, said first condition is that a current value of global multiplicity is not less than a specified maximum value of global multiplicity, said second condition is that the current value of global multiplicity is less than the specified maximum value of global multiplicity; and after said ascertaining, for each transaction group, issuing or not issuing an instruction to each server to change a current value of maximum permitted local multiplicity for each server to a new value of maximum permitted local multiplicity for each server, said issuing or not issuing being dependent on both the ascertained condition and whether a third condition is satisfied, said third condition being that the current value of maximum permitted local multiplicity is a default value of maximum permitted local multiplicity for each server The present invention provides a computer-usable program adapted to perform a method for managing server load for executing transactions of an application program on N servers, said N at least 2, the transactions of the application program grouped into T transaction groups, said T at least 1, a local multiplicity for each server for each transaction group defined as a number of transactions concurrently performed by each server for each transaction group, a global multiplicity for each transaction group defined as a number of transactions concurrently performed by the N servers collectively for each transaction group, said method comprising:

ascertaining a condition for each transaction group, said condition being a first condition or a second condition, said first condition is that a current value of global multiplicity is not less than a specified maximum value of global multiplicity, said second condition is that the current value of global multiplicity is less than the specified maximum value of global multiplicity; and after said ascertaining, for each transaction group, issuing or not issuing an instruction to each server to change a current value of maximum permitted local multiplicity for each server to a new value of maximum permitted local multiplicity for each server, said issuing or not issuing being dependent on both the ascertained condition and whether a third condition is satisfied, said third condition being that the current value of maximum permitted local multiplicity is a default value of maximum permitted local multiplicity for each server.

The present invention efficiently manages server load executing transactions in a distributed computing environment.

DETAILED DESCRIPTION OF THE INVENTION

Embodiments of the present invention are described in detail while referring to the accompanying drawings. However, these embodiments do not limit the present invention, and not all the combinations of features explained in these embodiments are requisite as resolving means for the present invention.

The present invention provides a method and system for managing server load in distributed computing environment by controlling the upper limit value of the multiplicity of a server, a management server, a server and a program. The upper limit value of a local multiplicity is set for each of a plurality of servers included in a network and is the maximum permissible value of the number of transactions that can simultaneously be performed by the individual servers.

For a plurality of servers, the upper limit value of a global multiplicity is set that is the maximum permissible value of the total number of transactions that can simultaneously be performed. A management server that manages multiple servers monitors a current value of the global multiplicity, which is the total number of transactions performed by the servers simultaneously or in a common time frame. When the current value of the global multiplicity is equal to or greater than the upper limit value, the management server generates a first instruction to change the upper limit value of a local multiplicity, which is the number of transactions performed by a server, to the current value of the local multiplicity.

The management server transmits the first instruction to one of the servers, and upon receiving the first instruction, the server changes the upper limit value of the local multiplicity to the current value of the local multiplicity.

In addition, on condition that the current value of the global multiplicity is smaller than the upper limit value of the global multiplicity, the management server generates a second instruction to change the upper limit values of the local multiplicities of the servers to the default upper limit values of local multiplicities that are designated in advance for the servers.

The management server transmits the second instruction to the individual servers included in the network system. Upon receiving the second instruction from the management server, the servers change the upper limit values of the local multiplicities to the default upper limit values of local multiplicities that are predesignated of the servers.

The method of the present invention controls the upper limit value of a local multiplicity. The present invention also comprises a management server, a server, and/or a program or a program product. A program product can include, for example, a storage medium on which the above described program is stored.

According to the present invention, the upper limit value of the local multiplicity of a server can be effectively controlled.

A computer system and method can be used to implement the present invention and the present invention can be provided as a computer-usable program. Therefore, the mode for the present invention can be a hardware mode, a software mode or a combination software and hardware mode. The program can be recorded on an arbitrary computer readable storage medium, such as a hard disk, a DVD-ROM, a CD-ROM, an optical storage device or a magnetic storage device.

Figure 1:
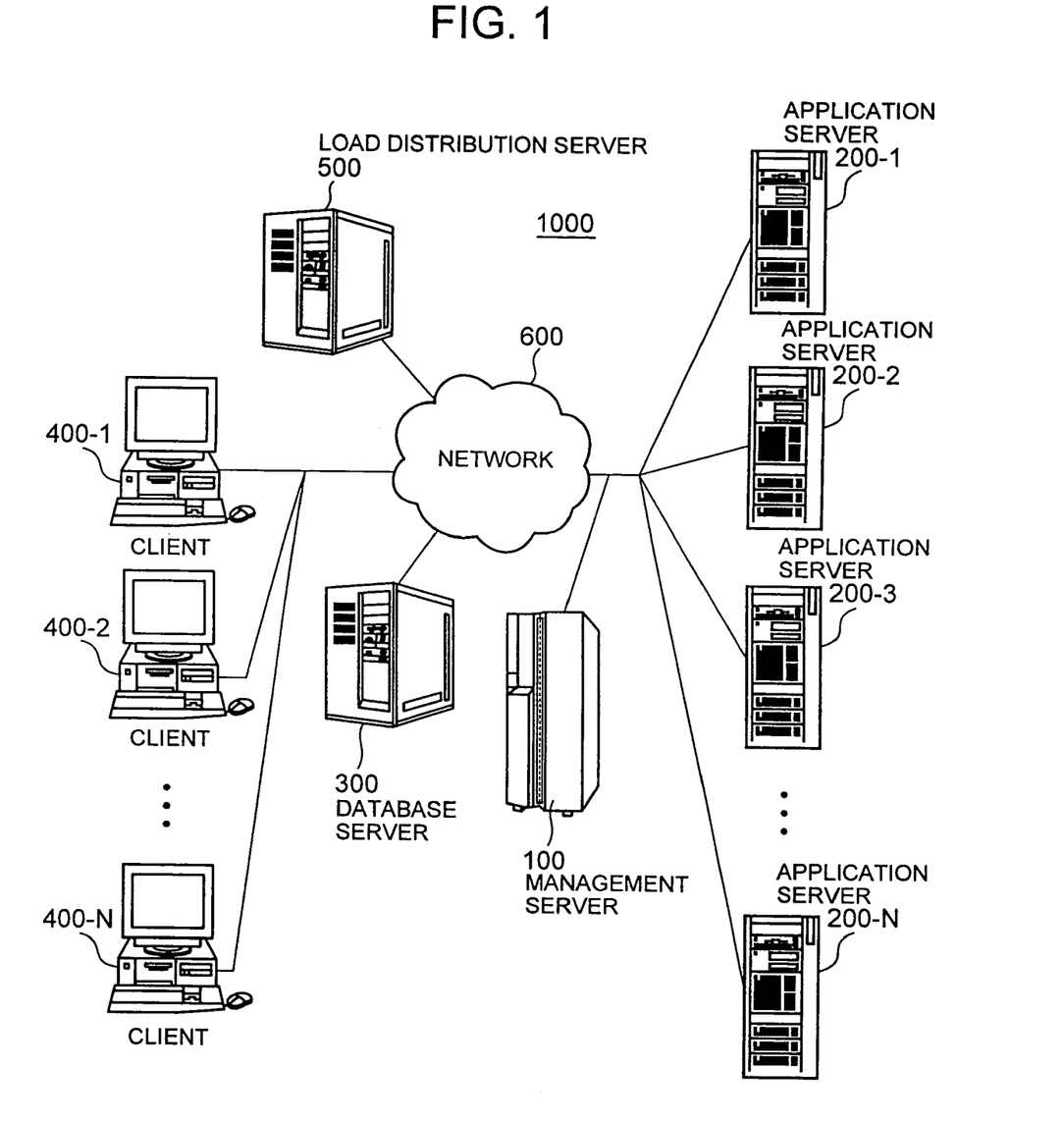
FIG. 1 is a high-level conceptual diagram showing a network system, in accordance with embodiments of the present invention.

FIG. 1 is a high-level conceptual diagram showing a network system 1000 that is a distributed computing environment, in accordance with embodiments of the present invention. The network system 1000 includes: a management server 100, a plurality of application servers 200-1 to 200-N (hereinafter, these may, in general, be called application servers 200), a database server 300, a plurality of client computers 400-1 to 400-N (hereinafter, these may, in general, be called client computers 400), and a load distributed server 500, all of which are connected by a network 600. Only one client computer 400 may be present in the network system 1000.

The management server 100 has as a function the monitoring of loads imposed on the application servers 200. More specifically, in accordance with predesignated grouping rules, the management server 100 examines, for each transaction group, the current value of a local multiplicity, which is the number of transactions performed by an application server 200, and monitors the load imposed on the pertinent application server 200. Further, based on the monitoring results obtained, the management server 100 may generate an instruction to change the upper limit value of the local multiplicity of the application server 200 for one or more transaction groups. Furthermore, the management server 100 transmits this instruction to the application server 200 via the network 600.

The application servers 200 in this embodiment are computers that, upon receiving requests from the client computers 400, activate transactions and provide application services. In this embodiment, a function of the application servers 200 is one whereby, as a service for the client computers 400, requests are transmitted to the database server 300, as needed, for the processing or updating of data records stored therein. The upper limit value of the local multiplicity, which is the maximum number of transactions that can be performed, is set for the individual application servers 200 for each transaction group. And in addition, the upper value of the global multiplicity is set. The global multiplicity is the maximum number of transactions that can be performed concurrently by the application servers 200 for each transaction group. A function of each individual application server 200 may be one whereby a notification is provided for the management server 100 of the number of transactions that the relevant application server 200 is currently performing.

The database server 300 stores, as records, data required for the execution of applications. Upon receiving a database processing request from the application server 200, the database server 300 performs the database processing for an appropriate record.

When manipulated by a user, the client computer 400 transmits a transaction processing request to the load distributed server 500 to permit one of the application servers 200-1 to 200-N to perform the transaction processing. The client computer 400 has a function for displaying the transaction processing results received from the pertinent application server 200, and presenting the results to the user.

The load distribution server 500 is theoretically located between the client computers 400 and the application server 200. The load distribution server 500 allocates, to one of the application servers 200-1 to 200-N, a transaction processing request that is received from the client computer 400 via the network 600. The application server 200 to which the transaction processing request is allocated performs the processing for a service, and forwards the results to the client computer 400.

In the network system 1000, the management server 100, the application servers 200, the database server 300, the client computers 400 and the load distributed server 500 can communicate with each other via the network 600. As an example, the Internet or an intranet that is well known can be employed as the network 600. The network 600, which can be the Internet or an intranet, connects the computers using TCP/IP (Transmission Control Protocol/Internet Protocol). For the network 600, a system is specified wherein an IP address, represented as a global address or a local address, is employed to perform communication.

Figure 2:
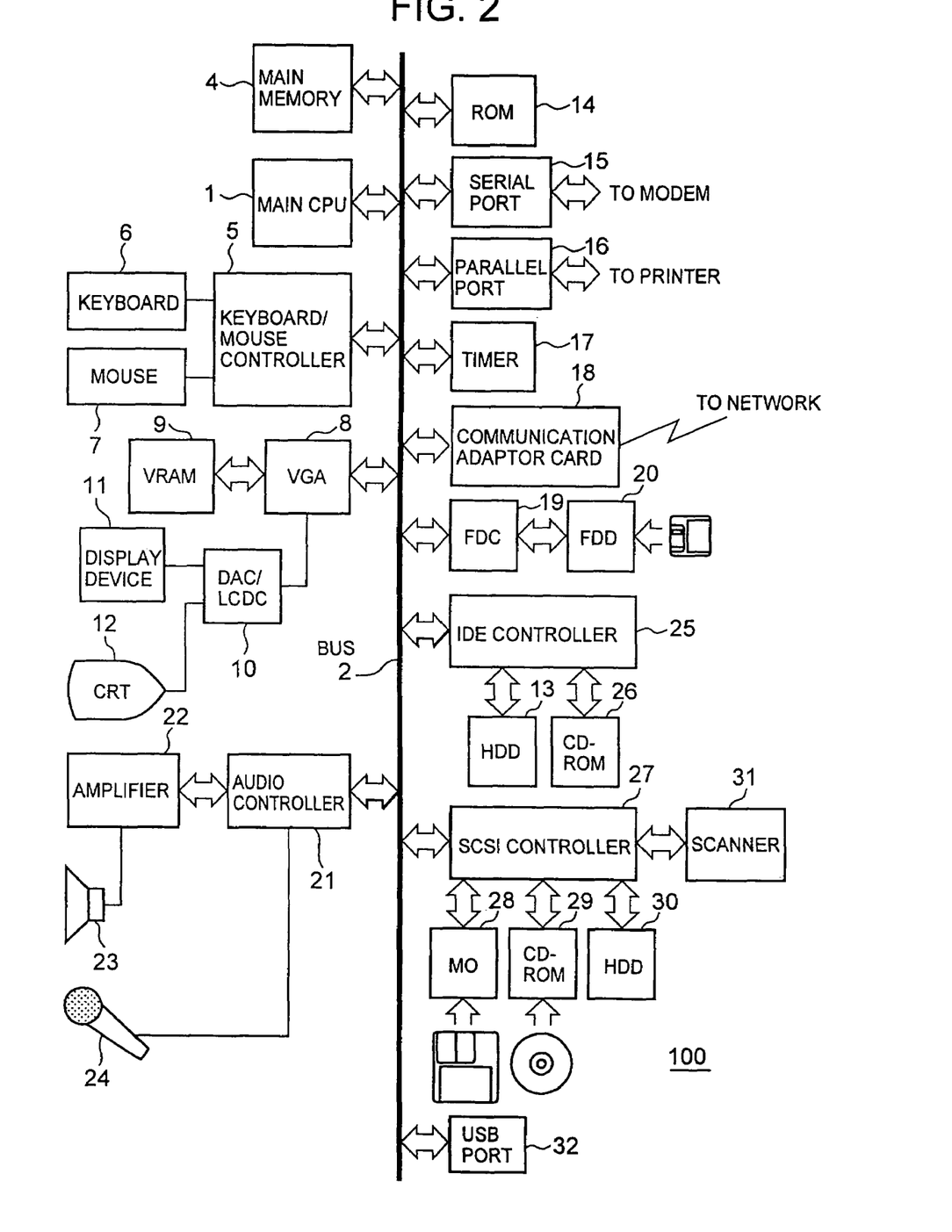
FIG. 2 is a diagram showing an appropriate example hardware configuration for a computer for providing a management server, application servers, a database server, client computers and a load distribution server, in accordance with embodiments of the present invention.

FIG. 2 is a diagram showing an appropriate example hardware configuration for an information processing apparatus for providing the management server 100, the application servers 200, the database server 300, the client computer 400 and the load distribution server 500, in accordance with embodiments of the present invention. The information processing apparatus includes a CPU (Central Processing Unit) 1 and a main memory 4 connected to a bus 2. Removable storage devices (external storage systems whereby recording media can be exchanged), such as a hard disk drive (HDD) 13 and a CD-ROM drive 26, are connected via an IDE controller 25. As will be apparent to one having ordinary skill in the art, in addition to or instead of the CD-ROM drive 26, another type of removable storage drive, such as a flexible disk drive, an MO drive, or a DVD-ROM drive, may be connected to the bus 2.

A recording medium, such as a flexible disk, an MO, a CD-ROM or a DVD-ROM, is inserted into the removable storage drive. The code for a computer program that instructs the CPU, in cooperation with an operating system, to carry out the present invention can be recorded on these recording media, on the hard disk drive 13 and in a ROM 14. The computer program is executed by being loaded into a main memory 4. The computer program may also be compressed, or may be divided into multiple segments for recording using a plurality of recording media.

The information processing apparatus accepts data entered, via a keyboard/mouse controller 5, by employing a user interface device, such as a keyboard 6 or a mouse 7. The information processing apparatus is connected to a display device 11 for presenting visual data to a user via a video controller 10, and are coupled to the bus 2 via VGA 8 to which VRAM 9 is connected.

The computers 200 include USB ports 32 used for connecting various types of USB devices.

For communication, the information processing apparatus can be connected to a network via a communication adaptor card 18 (e.g., an ethernet (R) card or a token ring card). And although not shown, the information processing apparatus can also be connected to a printer via a parallel port 16, or can be connected to a modem via a serial port 15.

An audio controller 21 is connected to the bus 2. A speaker 23 is coupled to the audio controller 21 via an amplifier 22 and a microphone 24 is also coupled to the audio controller 21.

A timer 17 is connected to the bus 2.

FDD 20 is coupled to the bus 2 via FDC 19.

A SCSI controller 27 is connected to the bus 2. MO 28, CD-ROM 29, HDD 30, and scanner 31 are each connected to the SCSI controller 27.

The management server 100, the application servers 200, the database server 300, the client computers 400 and the load distribution server 500 can be appropriately provided by an information processing apparatus, such as a main frame, a work station or a common personal computer, or a combination of them. It should be noted, however, that the components shown in FIG. 2 are merely examples, and not all the components are requisite components of the present invention.

It can be easily understood by one having ordinary skill in the art that the hardware components of the information processing apparatus used in conjunction with the present invention can be variously modified; e.g., the functions of the components can be distributed to a set consisting of a plurality of machines. Such modifications are ideas naturally included within the concept of the present invention.

The operating system of the information processing apparatus can be an operating system that supports a GUI (Graphical User Interface) multi-window environment, such as Windows (R), provided by Microsoft Corporation, AIX (R), provided by International Business Machines Corporation, MacOS (R), provided by Apple Computer Incorporated, or Linux (R).

Further, an operating system having a character based environment, such as PC-DOS, provided by International Business Machines Corporation, or MS-DOS, provided by Microsoft Corporation, can also be employed for the information processing apparatus. Furthermore, for the server, OS Open, provided by International Business Machines Corporation, a real time OS such as Vx Works, provided by Wind River Systems, Inc., or an operating system built into a network computer, such as Java (R) OS, can also be employed.

Through the above explanation, it can be understood that the information processing apparatus used for this embodiment is not limited to a specific operating system environment.

Figure 3:
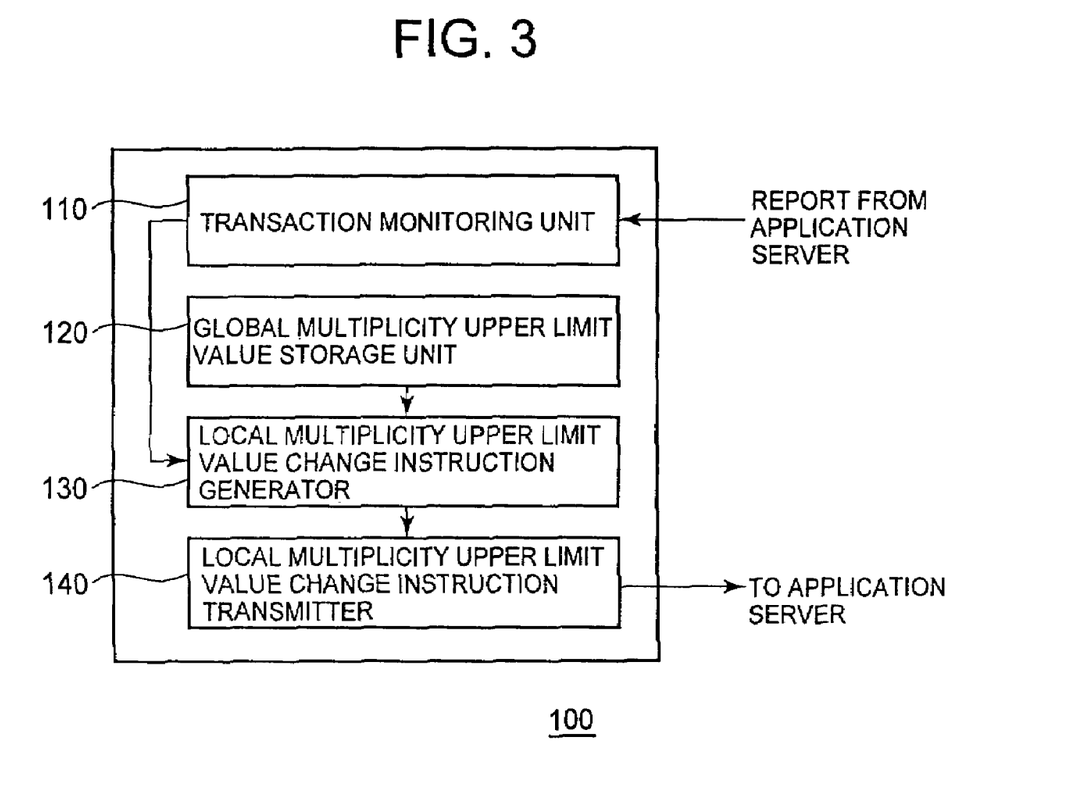
FIG. 3 is a functional block diagram showing the management server, in accordance with embodiments of the present invention.

FIG. 3 is a functional block diagram showing the management server 100, in accordance with embodiments of the present invention. The components listed in functional blocks in FIGS. 3 to 7 can be realized when, in an information processing apparatus having the hardware configuration in FIG. 2, the computer program stored on the hard disk 13 is loaded to the main memory 4 and is read and executed by the CPU 1 to permit the hardware resources and the software to cooperate. The management server 100 includes a transaction monitoring unit 110; a global multiplicity upper limit value storage unit 120; a local multiplicity upper limit value change instruction generator 130; and a local multiplicity upper limit value change instruction transmitter 140.

The transaction monitoring unit 110 monitors the transaction processing states of the application servers 200. More specifically, at predesignated time intervals, the transaction monitoring unit 110 transmits an instruction to the application servers 200-1 to 200-N to send a report, for each transaction group, on the number of transactions that are currently being performed, i.e., the current value of the local multiplicity. The transaction monitoring unit 110 receives, from the transaction count units of the application servers 200, responses that represent information for the current values of local multiplicities of the corresponding application servers 200.

The global multiplicity upper limit value storage unit 120 stores, for a specific application program set by a system manager, the upper limit value of a global multiplicity for each transaction group, which is the maximum number of transactions (pertaining to the specific application program) that can simultaneously be performed by a server group that includes the application servers 200-1 to 200-N.

The local multiplicity upper limit value change instruction generator 130 generates a local multiplicity upper limit value change instruction for each application server 200, based on information obtained by the transaction monitoring unit 110 as to the number of transactions being performed by the application server 200, and the upper limit value of the global multiplicity stored in the global multiplicity upper limit value storage unit 120.

Specifically, when the total of the transactions performed by the application servers 200-1 to 200-N, i.e., the current value of the global multiplicity, is equal to or greater than the upper limit value of the global multiplicity, the local multiplicity upper limit value change instruction generator 130 generates an instruction (called "a first instruction" in the specifications) to change the upper limit value of the local multiplicity of each application server 200 to the current value of the local multiplicity of the corresponding application server 200.

When the current values of the global multiplicities of the application servers 200-1 to 200-N are smaller than the upper limit values of the global multiplicities, the local multiplicity upper limit value change generator 130 generates an instruction (called "a second instruction" in the specifications) to change the upper limit values of the local multiplicities of the application serves 200 to default upper limit values of local multiplicities predesignated of the application servers 200.

The local multiplicity change instruction transmitter 140 transmits, to the individual application servers 200, the instruction generated by the local multiplicity upper limit value change generator 130.

Figure 4:
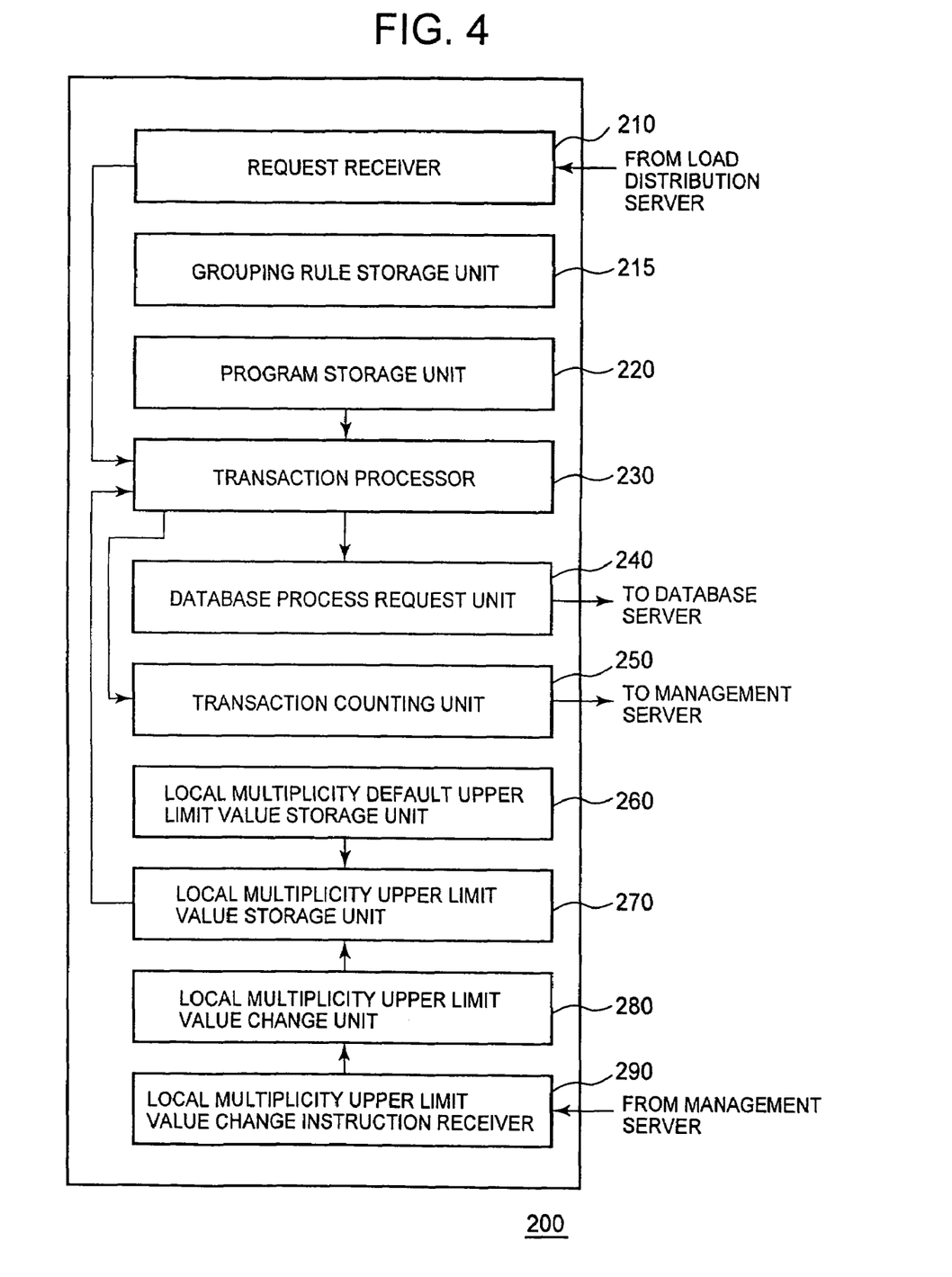
FIG. 4 is a functional block diagram showing the application server, in accordance with embodiments of the present invention.

FIG. 4 is a functional block diagram showing the application server 200, in accordance with embodiments of the present invention. The application server 200 includes: a request receiver 210, a grouping rule storage unit 215, an application program storage unit 220, a transaction processor 230, a database processing request unit 240, a processed transaction counting unit 250, a local multiplicity default upper limit value storage unit 260, a local multiplicity upper limit value storage unit 270, a local multiplicity upper limit changing unit 280 and a local multiplicity upper limit value change instruction receiver 290.

The request receiver 210 receives a transaction processing request, allocated by the load distribution server 500, wherein the request is transmitted to the transaction processor 230, which then processes the request.

The grouping rule storage unit 215 stores rules for grouping transactions to be processed by the application server 200. That is, the transactions of the specific application program to be executed are grouping, in accordance with grouping rules, into T transaction groups, wherein T is a positive integer (e.g., T=1, 2, 3, . . . ). Then, the current value of the local multiplicity and the current value of the global multiplicity are monitored for each transaction group. Further, the upper limit value of the local multiplicity and the upper limit value of the global multiplicity are designated for each transaction group.

The application program storage unit 220 is used to store an application program that is developed, and is suitable, for various business processes. One having ordinary skill in the art can develop an application program to be stored in the application program storage unit 220 by using an application development framework, such as Struts, developed by the Jakarta Project. Struts is an application framework for a well known open source that is useful for web application development using the generally well known Java Servlet/JSP technique.

The transaction processor 230 processes the transaction process request received by the request receiver 210. Specifically, based on the contents of the transaction process request, the transaction processor 230 calls up an appropriate application program from the application program storage unit 220 and performs the transaction processing. The transaction processor 230 can process transactions belonging to each transaction group, up to a count equivalent in number to the upper limit value of the local multiplicity that is stored for the relevant transaction group in the local multiplicity upper limit value storage unit 270.

Further, the transaction processor 230 issues an instruction to the database process request unit 240 to perform database processing as needed. The database process request unit 240 transmits, to the database server 300, a database process request that is generated based on the instruction received from the transaction processor 230. The database process request may be generated using a well known SQL (Structured Query Language) form. The database process request unit 240 also receives a response from the database server 300, relative to the transmitted database process request, and transmits the received response to the transaction processor 230.

The performed transaction counting unit 250 counts, for each group, the number of transactions currently being performed by the transaction processor 230; i.e., measures the current value of the local multiplicity. In accordance with a request received from the management server 100, the performed transaction counting unit 250 can transmit to the management server 100 the current value of the local multiplicity for each transaction group.

The local multiplicity default upper limit value storage unit 260 stores, for each transaction group, the default upper limit value of the local multiplicity of each application server 200 that is designated by the manager. In one embodiment, when the current value of the global multiplicity of the network system 1000 is smaller than the upper limit value of the global multiplicity, the default upper limit value of the local multiplicity indicates the number of transactions that belong to the transaction group and that the manager permits the pertinent application server 200 to simultaneously perform.

The local multiplicity upper limit value storage unit 270 stores the upper limit value of the local multiplicity, which is the maximum number of transactions that can simultaneously be performed by the application server 200. The local multiplicity upper limit value change unit 280 translates a local multiplicity upper limit value change instruction received by the local multiplicity upper limit value change receiver 290, and issues an instruction to change the upper limit value of the local multiplicity of the application server 200, which is stored in the local multiplicity upper limit value storage unit 270. The local multiplicity upper limit value change instruction receiver 290 receives, from the management server 100, the local multiplicity upper limit value change instruction, which includes the first instruction and the second instruction described above.

Figure 5:
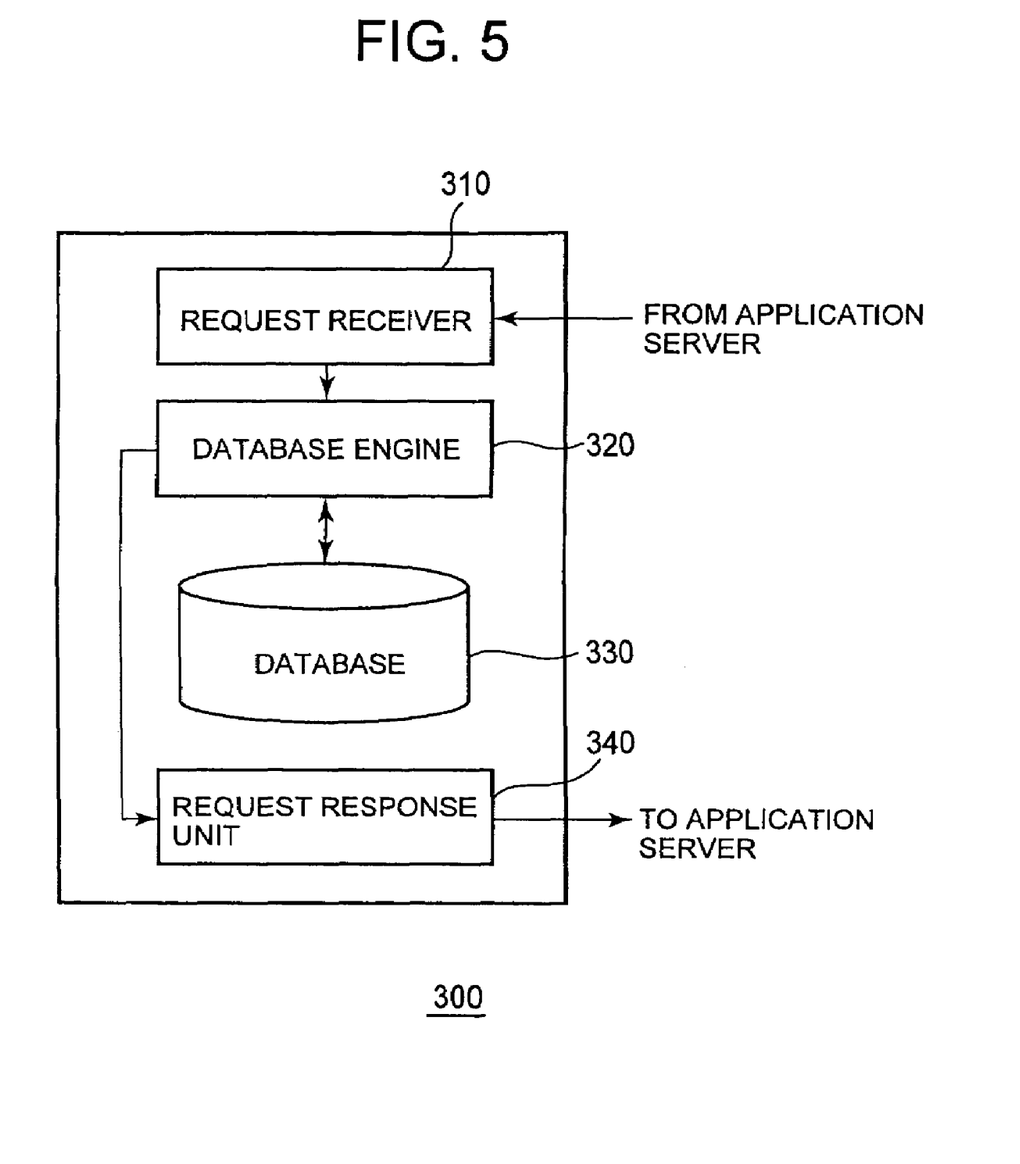
FIG. 5 is a functional block diagram showing the database server, in accordance with embodiments of the present invention.

FIG. 5 is a functional block diagram showing the database server 300, in accordance with embodiments of the present invention. The database server 300 includes: a request receiver 310, a database engine 320, a database 330 and a request response unit 340. The database server 300 can be appropriately built by using database management system (DBMS) software of a relational database type, such as a DB2 (R) universal database product provided by International Business Machines Corporation, an Access (R) product provided by Microsoft Corporation or an Oracle (R) Database product provided by Oracle Corporation. However, the database server 300 is not limited to these products.

The request receiver 310 receives a database process request transmitted by the database process request unit 240 of the application server 200. The database engine 320 translates the database process request received by the request receiver 310, and obtains appropriate data from data stored in the database 330. The database 330 is used to store, as database records, data required for the transaction processing. The request response unit 340 can transmit, to the application server 200, the data obtained by the database engine 320.

Figure 6:
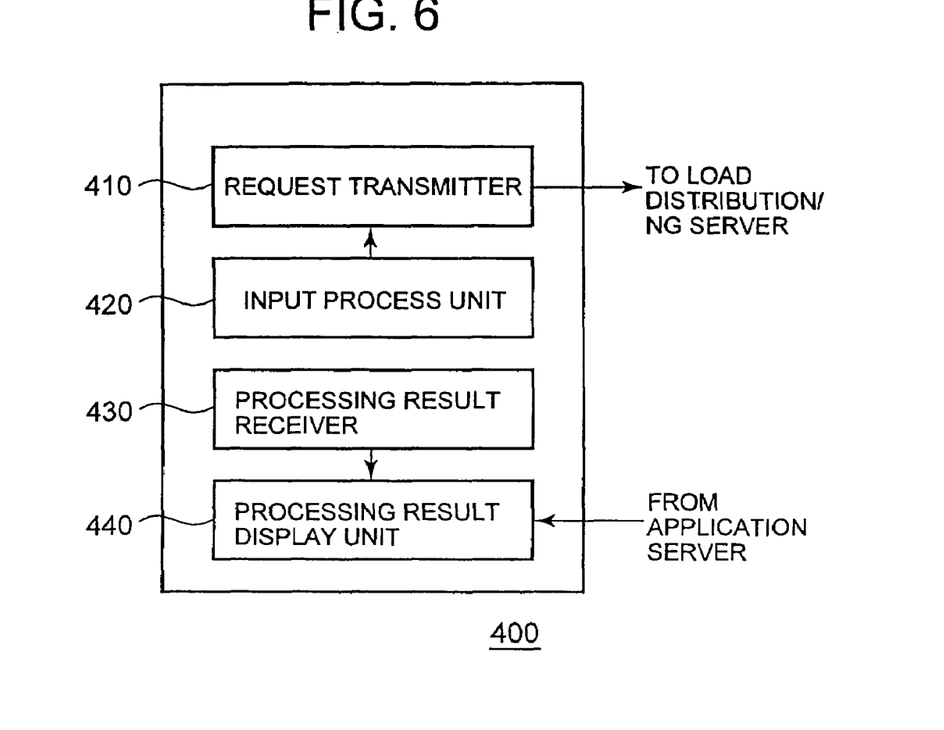
FIG. 6 is a functional block diagram showing the client computer, in accordance with embodiments of the present invention.

FIG. 6 is a functional block diagram showing the client computer 400, in accordance with embodiments of the present invention. The client computer 400 includes a request transmitter 410, an input process unit 420, a processing results receiver 430 and a processing results display unit 440.

When the user of the client computer 400 manipulates the user console unit 420, such as a keyboard or a mouse, to instruct the transmission of a transaction process request, the request transmitter 410 transmits the transaction process request to the load distribution server 500. The processing result receiver 430 receives, from one of the application servers 200, the processing results relative to the transaction process request transmitted by the request transmitter 410. The processing results display unit 440 displays, on a display unit, for example, the processing results received by the processing results receiver 430.

Figure 7:
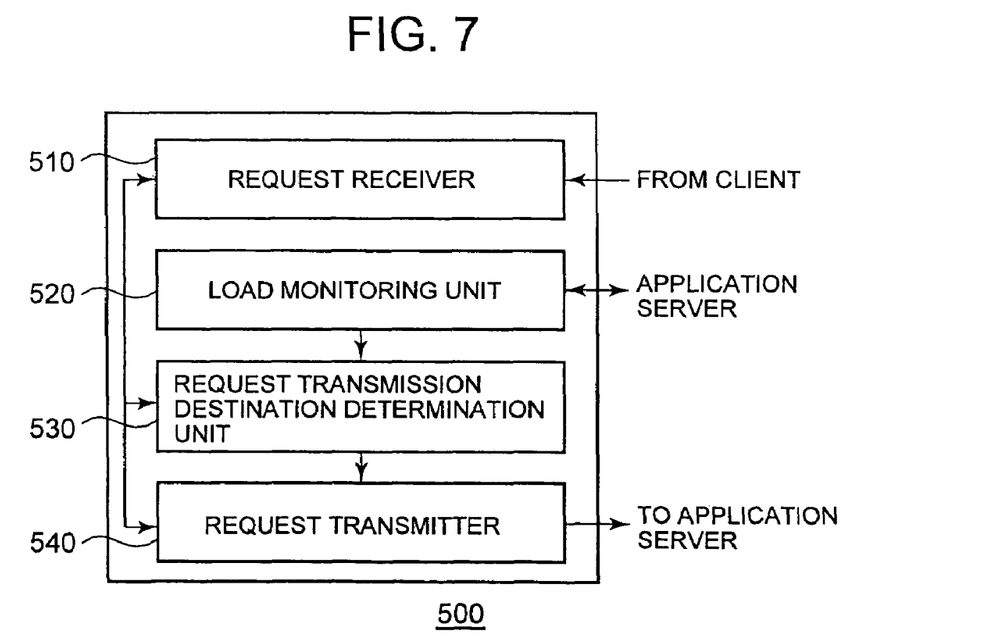
FIG. 7 is a functional block diagram showing the load distribution server, in accordance with embodiments of the present invention.

FIG. 7 is a functional block diagram showing the load distribution server 500, in accordance with embodiments of the present invention. The load distribution server 500 includes a request receiver 510, a load monitoring unit 520, a request transmission destination determination unit 530, and a request transmitter 540.

The request receiver 510 receives a transaction process request from the request transmitter 410 of the client computer 400. The load monitoring unit 520 monitors the load states of the individual application servers 200. In accordance with the contents of the transaction process request received by the request receiver 510 and the load states of the individual application servers 200 obtained by the load monitoring unit 520, the request transmission destination determination unit 530 employs a predetermined algorithm to determine which application server 200 should process the transaction process request. There are many well known algorithms, such as a round-robin algorithm that takes the load state into account, for determining an application server as a request transmission destination, and since an algorithm can be appropriately designed by one having ordinary skill in the art, no further explanation for it will be given. The request transmitter 540 transmits the transaction process request, received by the request receiver 510, to the application server 200 determined by the request transmission destination determination unit 530.

Figure 8:
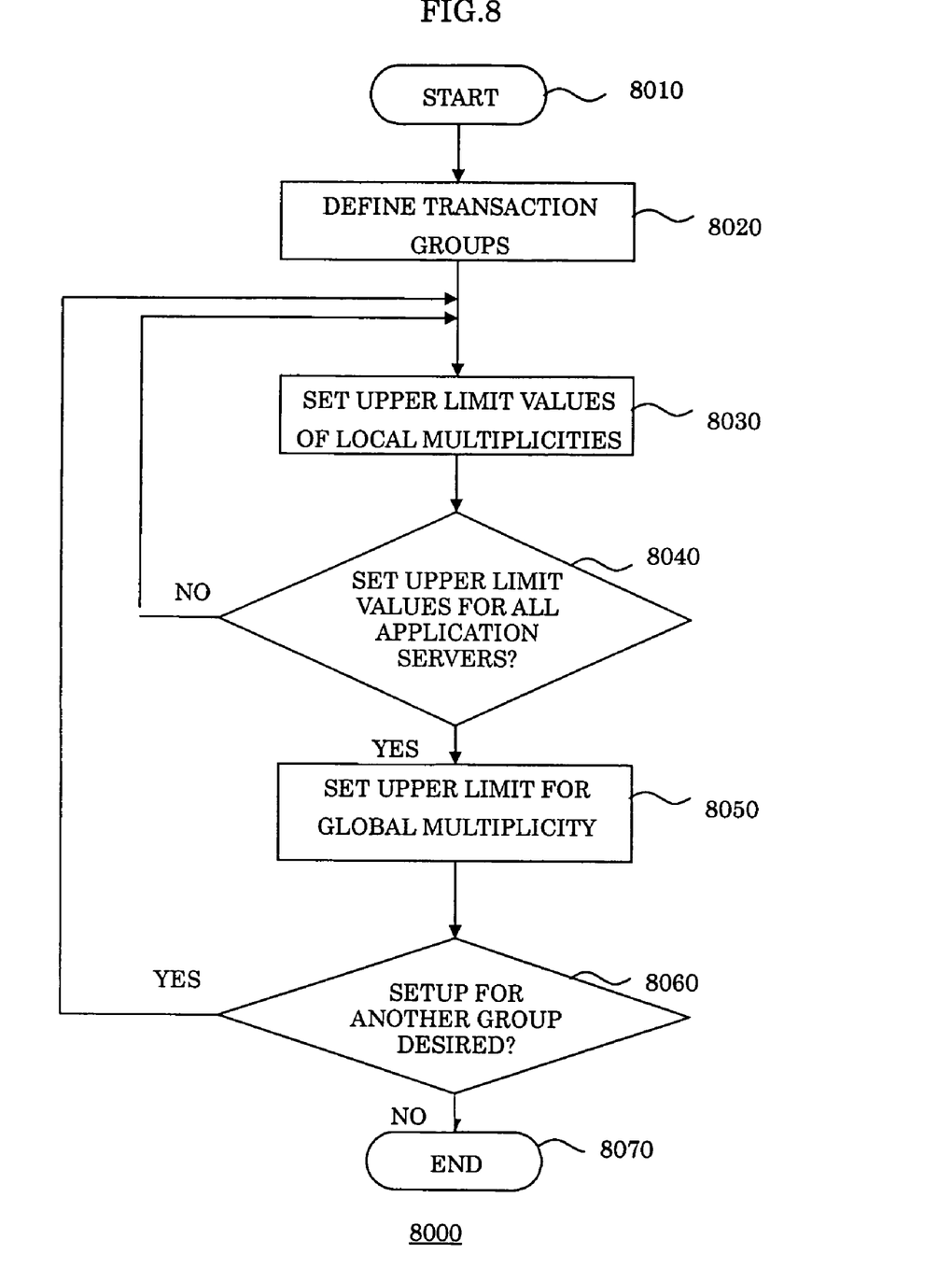
FIG. 8 is a flowchart showing the parameter setup processing performed by a network system, in accordance with embodiments of the present invention.

FIG. 8 is a flowchart 8000 showing the parameter setup processing performed by the network system 1000 for a specific application program, in accordance with embodiments of the present invention. In this embodiment, it is assumed that the manager manipulates the input device, such as the keyboard or the mouse, of the management server 100 to concentrically set up parameters. However, the setup of parameters is not limited to this operation. Specifically, by using input devices belonging to the individual application servers 200, the upper limit values of the local multiplicity may be set, by different managers, for the corresponding application servers 200.

The parameter setup processing is initiated at step 8010, and at step 8020, rules for the grouping of transactions are defined to the formation of T transaction groups. The grouping rules are defined, for example, as group transactions to be processed by a specific application program, and are then stored in the grouping rule storage unit 215. Program control advances to step 8030, and for a transaction group for which the rule is designated at step 8020, the upper limit value of the local multiplicity is designated for a specific application server 200. The designated upper limit value of the local multiplicity is transmitted to the specific application server 200, and is stored in the local multiplicity default upper limit value storage unit 260 as a default upper limit value of the local multiplicity of this application server 200. Although the default upper limit value of the local multiplicity may be specific to each application server 200, a same default upper limit value of the local multiplicity may be selected for each application server 200.

When, at step 8040, there are still application servers 200 for which the setup is required, program control returns to step 8030, and the setup of the upper limit value of the local multiplicity is performed. When, at step 8040, there are no more application servers 200 for which the setup is required, program control advances to step 8050.

At step 8050, the upper limit value of the global multiplicity is set for a transaction group for which the grouping rule is set at step 8020 and the designated upper limit value is stored in the global multiplicity upper limit value storage unit 120 of the management server 100.

Program control advances to step 8060, and the manager decides whether another transaction group should be set up.

When, at step 8060, the manager desires to define another transaction group, program control returns to step 8030, and the processes at step 8030 to 8050 are repeated. When, however, at step 8060, the manager does not desire to define more transaction groups, program control advances to step 8070 and the processing is terminated.

As a result of the steps in flow chart 8000 having been performed, a default upper limit value of the local multiplicity for each transaction group has been stored in the grouping rule storage unit 215 of each application server 200, and an upper limit value of the global multiplicity for each transaction group has been stored for each transaction group in the global multiplicity upper limit value storage unit 120 of the management server 100.

Figure 9:
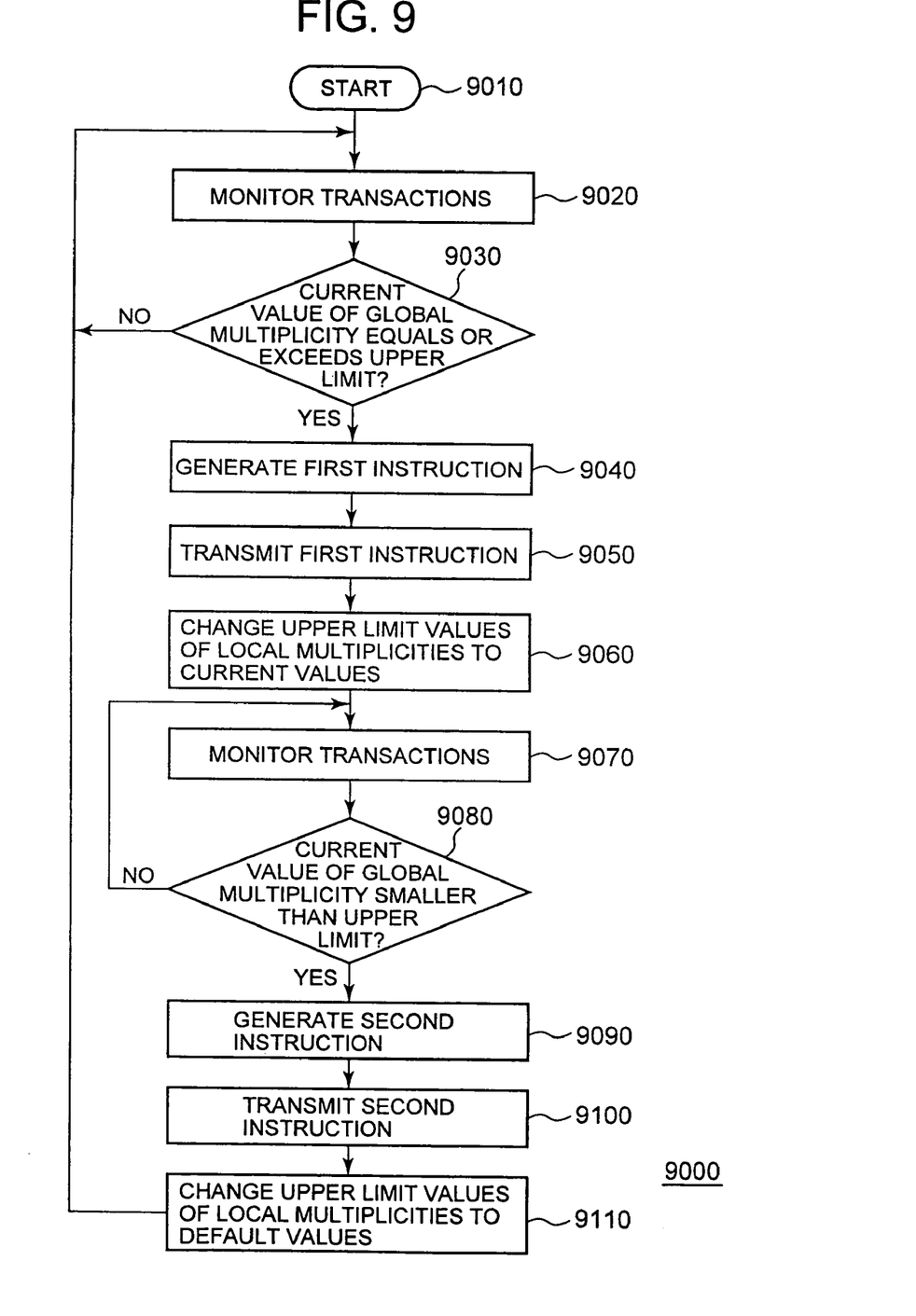
FIG. 9 is a flowchart showing the local multiplicity upper limit value changing processing performed by the network system, in accordance with embodiments of the present invention.

FIG. 9 is a flowchart 9000 showing the local multiplicity upper limit value changing processing performed by the network system 1000, in accordance with embodiments of the present invention. It should be noted that in the processing in the flowchart 9000, transactions are mapped to the transaction groups that are defined, at step 8020 of FIG. 8, in accordance with the grouping rules, and the individual steps in the flowchart 9000 are independently performed for the transaction groups defined at step 8020 in the flowchart 8000. The local multiplicity upper limit value changing processing is initiated at step 9010, and at step 9020, the number of transactions being performed by each application server 200, i.e., the current value of the local multiplicity, is monitored for each transaction group.

At step 9030, in order to determine whether the entire system is busy, for a specific transaction group, the total number of transactions being performed by the application servers 200, i.e., the current value of the global multiplicity, is calculated (e.g., by summing over the current value of local multiplicity of the N servers) and a check is performed to determine whether the total number of transactions is equal to or greater than the upper limit value of the global multiplicity that is designated for each application server 200. When the currant value of the global multiplicity for each transaction group is less than the upper limit value of the global multiplicity, it is determined that as yet, the entire system is not busy. Thus, program control returns to step 9020, and monitoring of the number of transactions is continued. When, for a specific transaction group, the current value of the global multiplicity is equal to or greater than the upper limit value of the global multiplicity, it is determined that the entire system is busy, and program control advances to step 9040.

At step 9040, a "first instruction" is generated to change the upper limit values of the local multiplicities of the individual application servers 200 to the numbers of transactions currently being performed by the application servers 200. Then, program control advances to step 9050, and the first instruction generated at step 9040 is transmitted to the individual application servers 200. At step 9060, the application servers 200, upon receiving the first instruction, change (in the local multiplicity upper limit value storage unit 270 of FIG. 4) the upper limit values of the local multiplicities of the application servers 200 to the current values of the local multiplicities (from the transaction counting unit 250 of FIG. 4).

Following this, program control advances to step 9070, and the management server 100 monitors the current values of the local multiplicities of the individual application servers 200. At step 9080, in order to determine for a specific transaction group whether the entire system has recovered from the busy state, the current value of the global multiplicity is calculated, and a check is performed to determine whether the current value of the global multiplicity is smaller than the upper limit value of the global multiplicity. When the current value of the global multiplicity is equal to or greater than the upper limit value of the global multiplicity, i.e., when the current value of the global multiplicity is not smaller than the upper limit value of the global multiplicity, it is determined that the entire system is still in the busy state. Thus, program control returns to step 9070, and monitoring of the number of transactions is continued. When the current value of the global multiplicity is smaller than the upper limit value of the global multiplicity, it is determined that the entire system is no longer busy and program control advances to step 9090.

At step 9090, a "second instruction" is generated to change (in the local multiplicity upper limit value storage unit 270 of FIG. 4) the upper limit value of the local multiplicities of the application servers 200 to default upper limit values of local multiplicities that are predesignated for the application servers 200 (from the local multiplicity default upper limit value storage unit 260 of FIG. 4). Program control thereafter advances to step 9100, and the second instruction generated at step 9090 is transmitted to the individual application servers 200. At step 9110, the application servers 200, upon receiving the second instruction, change the upper limit values of the local multiplicities of the application servers 200 to the default upper limit values that have been predesignated. Thereafter, program control returns to step 9020 and the previously performed processing is repeated.

Figure 10:
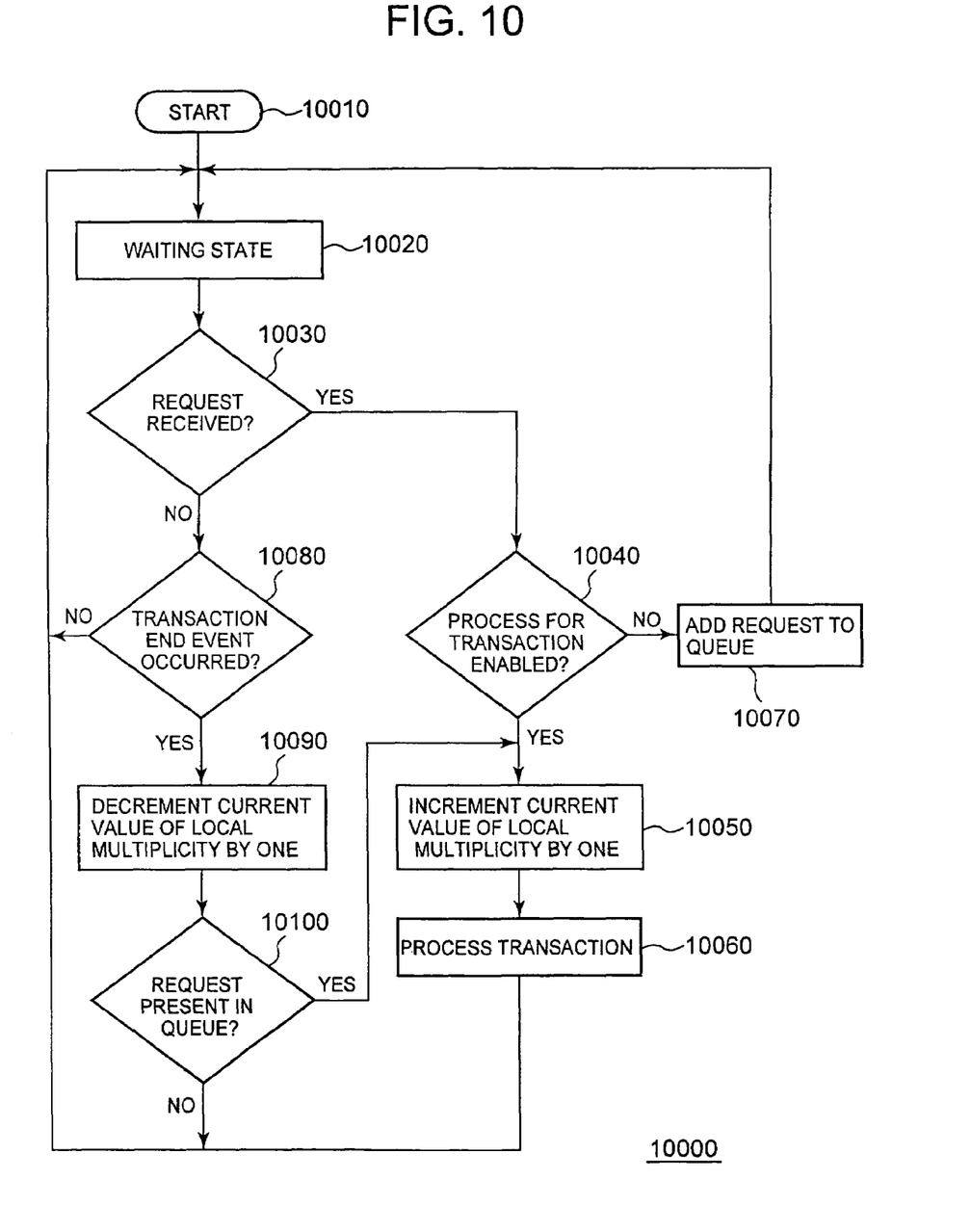
FIG. 10 is a flowchart showing the transaction processing performed by the application server, in accordance with embodiments of the present invention.

FIG. 10 is a flowchart 10000 showing the transaction processing performed by the application server 200, in accordance with embodiments of the present invention. It should be noted that in the flowchart 10000, as well as in the flowchart 9000, transactions are mapped to the transaction groups that are defined, at step 8020, in accordance with the grouping rules, and the individual steps in the flowchart 10000 are independently performed for the transaction groups defined at step 8020 in the flowchart 8000.

The transaction processing is initiated at step 10010, and at step 10020, the application server 200 waits to receive a transaction process request from the load distribution server 500, or the occurrence of an end event that indicates the completion of the transaction that is currently being performed.

When it is determined at step 10030 that a transaction process request has been received from the load distribution server 500, program control advances to step 10040, whereat a check is performed to determine whether the process for the received transaction process request has been enabled. Specifically, when the current value of the local multiplicity of the application server 200 is smaller than the upper limit value of the local multiplicity of the application server 200, it is determined that the process for the transaction process request has been enabled. When, however, the current value of the local multiplicity of the application server 200 reaches the upper limit value, it is determined that the process for the transaction process request has been disabled.

When it is determined at step 10040 that the process for the transaction process request has been enabled, program control advances to step 10050, whereat the number of performed transactions counted by the application server 200 is incremented by one. Program control then advances to step 10060 and the process for the received transaction process request is begun. Thereafter, program control returns to step 10020, and the application server 200 is again set to the waiting state.

When it is determined at step 10040 that the process for the transaction process request has been disabled, program control is shifted to step 10070, whereat the application server 200 adds, to the front of a queue, the transaction process request received at step 1030. As algorithms for processing requests in a queue, there are two methods, one for setting the upper limit value of the maximum queues and one for setting the upper limit value of the maximum queuing time and abandoning requests beyond this limit. Since one having ordinary skill in the art can appropriately design such an algorithm, no detailed explanation for it will be given. Program control thereafter returns to 10020 and the application server 200 is again set to the waiting state.

When it is determined at step 10030 that a transaction process request has not been received from the load distribution server 500, program control is shifted to step 10080, whereat a check is performed to determine whether an end event, indicating the completion of the transaction that is currently being performed, has occurred. When it is determined at step 10080 that an end event has not occurred, program control returns to step 10020 and the application server 200 is again set to the waiting state.

When it is determined at step 10080 that an end event has occurred, program control advances to step 10090, whereat the current value of the local multiplicity measured by the application server 200 is decremented by one. Then, program control advances to 10100, and a check is performed to determine whether a transaction process request is present in a queue.

When it is determined at step 10100 that no transaction process request is present in the queue, program control returns to step 10020 and the application server 200 is again set to the waiting state. When, however, it is determined at step 10100 that a transaction process request is present in the queue, program control is shifted to step 10050.

At step 10050, the current value of the local multiplicity measured by the application server 200 is incremented by one. Program control thereafter advances to step 10060 and the process for the transaction process request is begun. Program control then returns to step 10020 and the application server 200 is again set to the waiting state.

As described above, it can be easily understood that, according to the present invention, the upper limit values of the local multiplicities, which are the maximum values of transactions that are designated for the individual application servers included in a server group and that can be simultaneously performed, can be effectively controlled.

The present invention has been explained by employing the embodiment; however, the technical scope of the invention is not limited to this embodiment. For example, the function of the management server in this embodiment can be provided for a load distribution server or a database server, or can be provided for one of the application servers. Further, it will be obvious to one having ordinary skill in the art that various modifications or alterations of the embodiment can be made. Therefore, embodiments for which these modifications or alterations have been made are also included in the technical scope of the present invention.

What is claimed is:

1. A computer-implemented method for controlling a local multiplicity upper limit value of a first server in a management server for managing a plurality of first servers, comprising the steps of:
    monitoring global multiplicity current values of the plurality of first servers;
    processing transactions by an application server from the plurality of first servers, the processing transactions comprising:
        placing an application server from the plurality of first servers into a wait state until a transaction is initiated by a load distribution server from the plurality of first server;
        decrementing the local multiplicity current value at the determination that a transaction event has been completed;
        incrementing the local multiplicity current value at the determination that the transaction process has been enabled;
        adding disabled processes to a queue to re-initiate the process;
    processing groups of the transactions with regards to local and global multiplicity values in independent processing transactions; and
    producing a first instruction to change a local multiplicity upper limit value of the first server to a local multiplicity current value of the first server, on condition that the global multiplicity current value is equal to or greater than global multiplicity upper limit values of the plurality of the first servers, wherein
    the global multiplicity current value is the total number of transactions executed by the plurality of the first servers in a specified time frame;
    the local multiplicity current value is the number of transactions executed by the first server in a specified time frame;
    the global multiplicity upper limit value is a maximum tolerance of the total number of the simultaneously-executable transactions by the plurality of the first servers; and
    the local multiplicity upper limit value is a maximum tolerance of the number of the simultaneously-executable transactions in the first server.

2. The method according to claim 1 further comprising the step of transmitting the first instruction to one of the plurality of the first servers.

3. The method according to claim 1 further comprising the step of producing a second instruction to change the local multiplicity upper limit value of the first server to the local multiplicity default upper limit value predetermined to the first server, on condition that the global multiplicity current value is smaller than the global multiplicity upper limit value.

4. The method according to claim 3 further comprising the step of transmitting the second instruction to one of the plurality of the first servers.

5. The method according to claim 1 further comprising the steps of:
    processing a group of transactions by the plurality of the first servers;
    setting the local multiplicity upper limit value of the first server to the transaction group; and
    setting the global multiplicity upper limit value to the transaction group.

6. The method according to claim 5 further comprising the step of mapping the transaction to any of the transaction groups, wherein
    the step of monitoring and the step of producing the first instruction are conducted per transaction group.

7. The method according to claim 1 further comprising the step of transmitting a request to one of one or more of second servers by one of the plurality of the first servers.

8. The method according to claim 7, wherein the first server is an application server and the second server is a database server.

9. The method according to claim 1, wherein at least a part of the transactions is started by a request from one or more client computers.

10. The method according to claim 1, wherein the step of monitoring comprises the steps of
    calculating a total of the local multiplicity current values received from each of the plurality of the first servers; and
    repeating the step of calculating at predetermined time intervals.

* * * * *